United States Patent

Matysek

[15] 3,644,884

[45] Feb. 22, 1972

[54] MODULAR TIMER FOR USE IN TRAFFIC CONTROL SYSTEMS

[72] Inventor: John J. Matysek, Crozet, Va.

[73] Assignee: Remote Controls Corporation

[22] Filed: May 20, 1969

[21] Appl. No.: 826,212

[52] U.S. Cl. ..........340/40

[51] Int. Cl. ..........G08g 1/07

[58] Field of Search ..........340/35, 37, 90

[56] References Cited

UNITED STATES PATENTS

| | | | |
|---|---|---|---|
| 3,473,147 | 10/1969 | Hill | 340/37 |
| 3,430,069 | 2/1969 | Hendricks | 340/41 X |
| 3,383,653 | 5/1968 | Bolton et al. | 340/37 |
| 2,926,333 | 2/1960 | Masten | 340/40 |
| 2,758,293 | 8/1956 | Hitchins | 340/40 |

OTHER PUBLICATIONS

Manual on Uniform Traffic Control Devices for Streets and Highways; U.S. Department of Commerce, Bureau of Public Roads, Wash. D.C. June 1961 (Available from the Superintendent of Documents, Gov' t Printing Office.)

*Primary Examiner*—William C. Cooper
*Attorney*—Malcolm L. Sutherland, John W. Behringer, James N. Dresser, Martin J. Brown, W. Brown Morton, Jr., John T. Roberts, Malcolm L. Sutherln and Morton, Bernard, Brown, Roberts & Sutherland

[57] ABSTRACT

A cyclic timer and a traffic controller incorporating that timer, and an intersection traffic control system. The timer includes a plurality of timing modules interconnected so that when one module completes the timing of its interval, it turns on the next timing module which, in turn, turns off the module that just completed its interval. The traffic controller further includes a switching unit which accepts inputs from the cyclic timer and in response thereto provides excitation for an intersection right-of-way indicator such as a traffic light. The intersection right-of-way control system permits drivers in preferred directions to continuously receive right-of-way as they traverse the system and provides preferred streets for every direction of travel.

15 Claims, 5 Drawing Figures

INVENTOR
JOHN J. MATYSEK

BY Mc Lean, Morton & Boustead

ATTORNEYS

MODULAR TIMER FOR USE IN TRAFFIC CONTROL SYSTEMS

The present invention pertains to a cyclic timer and to a traffic controller utilizing that timer to assign right-of-way intervals to conflicting traffic phases, and further to an intersection control system. More particularly, the present invention pertains to a cyclic timer capable of cyclically assigning timing intervals of different lengths to different output functions and to a controller for operating right-of-way signal indicators at a traffic intersection, and to a system for controlling right-of-way at intersections throughout an area so that in any direction of travel drivers are provided with preferred streets on which they continuously receive right-to-way as they traverse the intersection system. The controller is capable of independent, isolated and variable operation, and yet it can be brought under the control of a central control center when desired and can be easily coordinated with nearby controllers.

The flow of traffic in heavily traveled areas is generally controlled at least in part by means of signal indicators such as the well-known red-amber-green signal lamps which divide the right-of-way between the various conflicting traffic phases in accordance with some predetermined sequence. In urban areas the frequency of numerous consecutive major intersections on one main roadway may require such traffic control indicators at each such intersection. To permit smoothest traffic flow, it is desirable that the indicators at consecutive intersections be controlled to sequentially provide right-of-way on the main roadway so that a car travelling on that roadway will continuously receive the right-of-way and thus can travel from one end of the roadway to the other through the several controlled intersections without having to stop.

The direction of heaviest traffic flow determines the direction in which right-of-way is sequentially provided, and on a two-way street, this is liable to be different at different times of day, during morning and evening rush hours, for example. In addition, there are occasionally emergency or otherwise unusual situations during which it is desirable to suspend the normal operation of a right-of-way controller and instead to provide right-of-way indications suited to the particular situations. Thus, it is desirable to be able to override the normal controller operation during emergency situations.

In many metropolitan areas there is heavy traffic movement in all directions at particular times of day, and thus it is desired to be able to provide preferred streets for every traffic direction, so that regardless of the direction in which a motorist desires to travel, he can find a street on which he continuously receives right-of-way as he approaches consecutive intersections.

It is often desired to have right-of-way under the direct control of the centralized traffic controller during portions of the day, for example during morning and evening "rush hours," and under the control of the local controller during the remainder of the day, preferably with the signals sequenced so that traffic in one direction receives right-of-way sequentially at consecutive traffic intersections. While numerous controllers have been developed for controlling the signal indicators which divide the right-of-way between conflicting traffic phases, in general, these have been elaborate and complex electric apparatus which have been expensive to install and which are particularly subject to malfunction because of their complexity. The existing controllers which have been capable of supervision from a centralized main control center have required the existence of a large number of electrical conductors from each controller to the centralized control center. Presently known controllers which are intended for use in systems in which a central control center controls right-of-way during portions of the day generally must have an activating signal applied to them to cause them to take over operation from the central controller. Thus, if the central controller should fail, these presently known controllers would not take over, and no right-of-way indications would be provided at the intersection.

Numerous applications exist for cyclic timing circuits capable of cyclically providing indication a plurality of output terminals in sequence. Such outputs might be of brief duration, in the millisecond range, or they might be of considerably longer duration, for example, a duration in excess of 1 minute. The outputs might each be of the same duration, or they might each be of a different duration. In addition to a controller for cyclically assigning right-of-way to each of a plurality of conflicting traffic phases, such a timer might be utilized for such applications as cyclically turning on different lights on an advertising display, cyclically opening alternative outlet gates to divert a manufactured material to different packaging areas, or cyclically controlling a conveyor to cause material to be delivered automatically to a plurality of delivery stations.

The present invention is a cyclic timer capable of cyclically providing output indications at a plurality of output terminals in sequence. The duration of each output can be preset and is independent of the other output durations. Feedback of output indications insures inhibition of all stages but the next which is to provide an output.

In another aspect, the present invention is a traffic controller utilizing the cyclic timer of this invention and capable of independent operation to divide right-of-way between conflicting phases at a traffic intersection and yet capable of being overriden or of having its cycle adjusted from a centralized master controller, while requiring but a minimum number of conductors to interconnect the controller to the centralized master control center to permit such supervision. The controller of the present invention utilizes the cyclic timing circuit of this invention to time the various traffic intervals, and when the timing circuit indicates the termination of one interval, it automatically initiates the operation of the timing of the succeeding interval. As a traffic interval is being timed, the timing circuit enables a switching circuit which provides power to the right-of-way indicator for that traffic interval. A remote control input permits the operation of the traffic controller to be brought under the command of a centralized master controller so that an emergency function can be indicated or so that the control signals at consecutive intersections can be sequenced in a desired manner to cause right-of-way to be sequentially given to a particular traffic phase on a main roadway. The local controller can also be deactivated by the centralized master controller when it is desired to have that master controller control right-of-way. However, the local traffic controller is capable of independent operation, and, should the centralized master controller become inoperative, the local controller automatically resumes control of right-of-way at the intersection.

In yet another aspect, the present invention is an intersection control system which provides preferred streets for each direction of travel so that every motorist is able to find a street on which he continuously receives right-of-way.

These and other aspects and advantages of the present invention are apparent in the following detailed description and claims, particularly when read in conjunction with the accompanying drawings in which like parts bear like reference numerals. In the drawings:

Figures 1, 3:
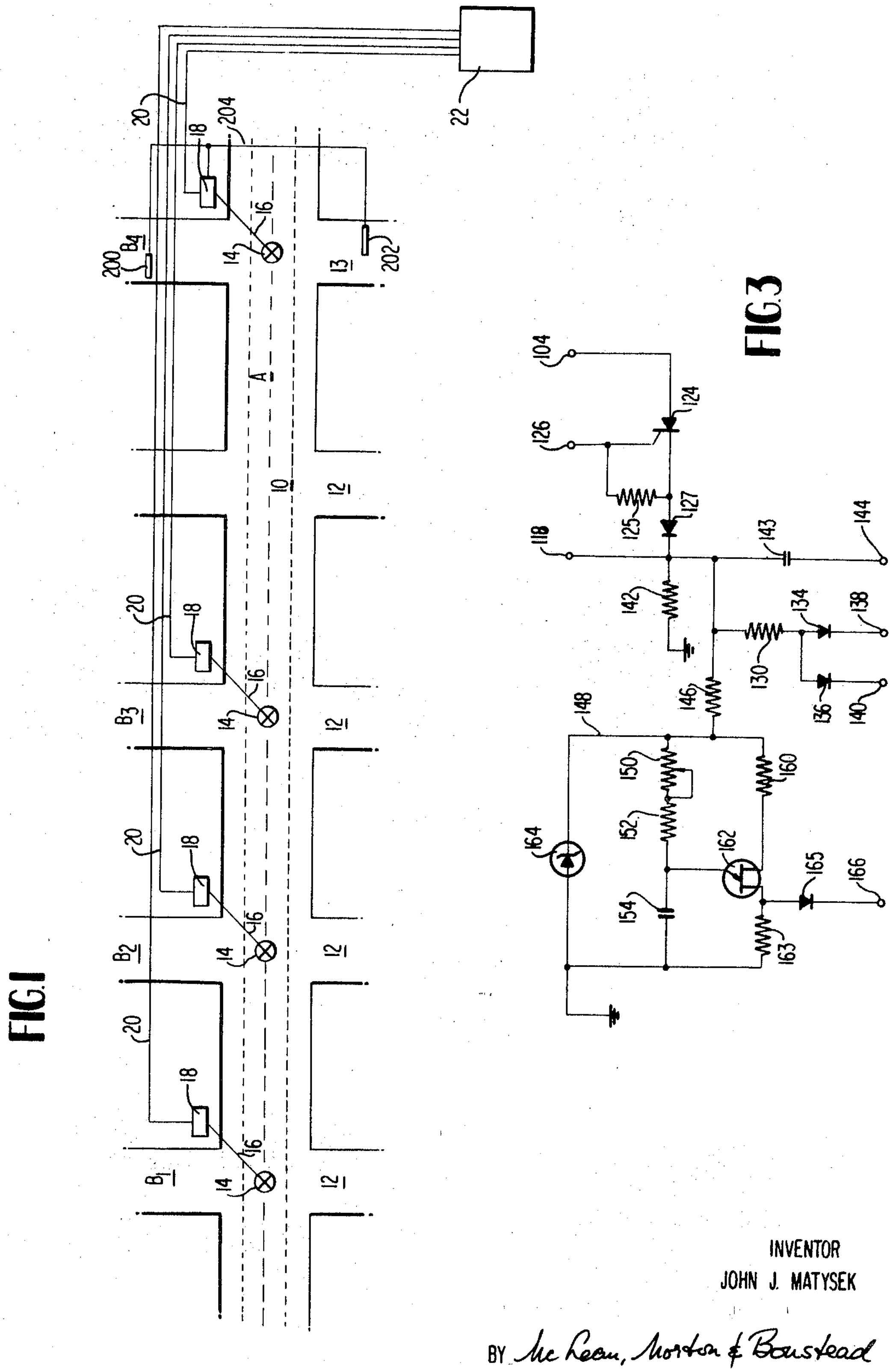
FIG. 1 is a diagrammatic representation of a main roadway, including a plurality of intersections each under the control of a traffic controller in accordance with the present invention.
FIG. 3 is a schematic diagram of another embodiment of a timing circuit suitable for use in the present invention.

FIG. 1 depicts a main roadway 10 which intersects a plurality of side streets 12 and 13. At various ones of the intersections the right-of-way is controlled by a signal indicator 14. Each indicator 14 is connected by a cable 16 to an associated controller 18. While each controller 18 is capable of independent operation, it is connected by a cable 20 to a master controller 22 which is located at some remote location and which is capable of overriding one or more of the local controllers if desired. Each of the right-of-way indicators 14 might be a standard, well-known red-yellow-green indicator light such as those commonly utilized to indicate right-of-way on the conflicting traffic phases.

Figure 2:
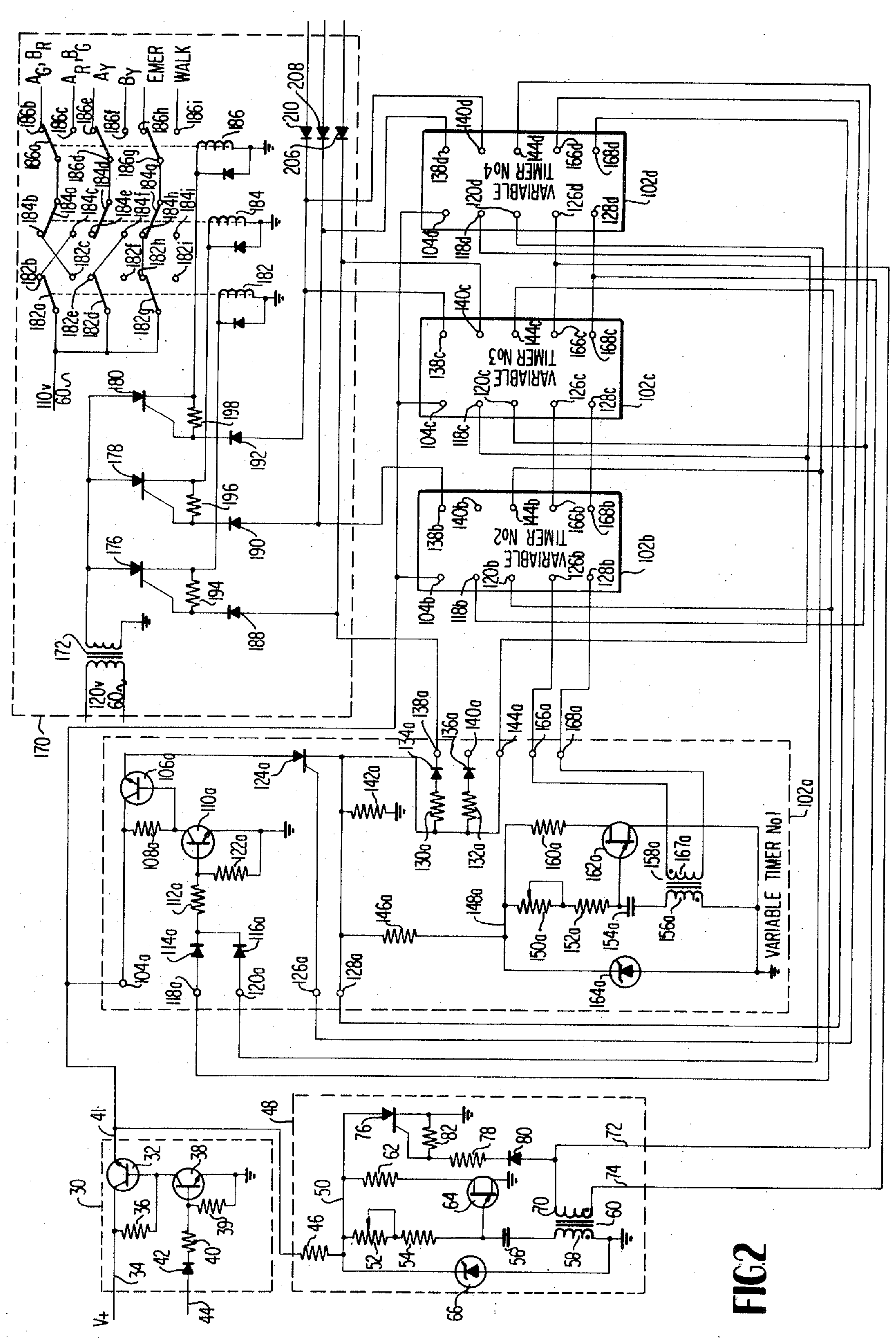
FIG. 2 is a schematic diagram, partially in block form, of a traffic controller in accordance with the present invention and including the cyclic timer of the present invention.

FIG. 2 depicts the detailed circuitry of each local controller 18. Power control unit 30 includes NPN-transistor 32 which has its collector connected by powerline 34 to a suitable source of direct current such as a source of +22 volts DC. Resistor 36 couples the collector and the base of transistor 32. The base of transistor 32 is also connected to the collector of NPN-transistor 38 which has its emitter tied to ground. The base of transistor 38 is coupled to the emitter thereof by resistor 39. The base of transistor 38 is coupled by resistor 40 to the cathode of diode 42. The anode of diode 42 is tied to remote input line 44 which is one of the conductors within cable 20.

The emitter of transistor 32 is tied to powerline 41 which provides power to the remainder of controller 18. One side of resistor 46 within synchronization unit 48 is tied to powerline 41, while the second side of resistor 46 is connected to line 50. Rheostat 52 has one end tied to line 50 and the other end coupled through resistor 54 to one plate of capacitor 56. The second plate of capacitor 56 is connected to the first side of primary 58 of transformer 60. The second side of primary 58 is tied to ground.

Resistor 62 is coupled between line 50 and base 2 of unijunction transistor (UJT) 64. Base 1 of UJT 64 is tied to ground, while the emitter of UJT 64 is connected to the junction of resistor 54 and capacitor 56. The cathode of zener diode 66 is tied to line 50, while the anode of diode 66 is grounded.

The first side of secondary 70 of transformer 60 is connected to output line 72, while the second side of secondary 70 is tied to output line 74. The side of secondary 70 tied to line 72 is of the same polarity as the side of primary 58 tied to capacitor 56, i.e., the voltage on line 72 is in phase with the voltage of the junction of primary 58 and capacitor 56. Silicon controlled rectifier (SCR) 76 has its anode tied to line 50, its cathode tied to ground, and its gate coupled through resistor 78 to the cathode of diode 80, the anode of which is connected to output line 72. The gate of SCR 76 is coupled to ground through resistor 82.

With voltage available on line 34 and no signal applied to input line 44, transistor 38 is cut off and transistor 32 is on. As a consequence, voltage is available on power line 41 from power control unit 30. When a positive voltage in the order of 3 volts is applied to input line 44, transistor 38 turns on, causing transistor 32 to cut off. As a consequence, no voltage is available on powerline 41. When voltage is first available on powerline 41, a charging path exists for capacitor 56 through resistor 46, rheostat 52, resistor 54, and primary winding 58. Once the voltage on capacitor 56 reaches the triggering level of UJT 64, the UJT fires, discharging capacitor 56. The resulting voltage pulse on primary 58 is applied through transformer 60 to output lines 72 and 74 which apply the pulse to a traffic interval timing unit within controller 18. As will be seen hereinafter, this timing unit then places a positive voltage on line 72, and this voltage is passed by diode 80 to the gate of SCR 76, causing the SCR to conduct. SCR 76 remains in its conducting condition so long as voltage is available on power line 41. As a consequence, SCR 76 clamps line 50 to a voltage so low that capacitor 56 can not charge to the triggering voltage of UJT 64. Therefore, UJT 64 is unable to fire again, so long as the voltage on power line 41 remains uninterrupted.

The timing of each traffic interval is controlled by a variable timer. In the illustrative example herein described, four traffic intervals are provided to assign right-of-way to two conflicting traffic phases. Thus, if at a given intersection the main roadway be designated phase A and the side roadway phase B, the four resulting traffic intervals are: phase A right-of-way, phase A clearance, phase B right-of-way, and phase B clearance. During the right-of-way interval for a traffic phase, the signal indicator provides a green indication to that traffic phase and a red indication to the conflicting traffic phase. During the clearance interval for a traffic phase, the signal indicator provides green and yellow (amber) indications to that traffic phase and a red indication to the conflicting traffic phase. If there are more than two traffic phases, each conflicting traffic phase is provided a red indication during the right-of-way and clearance intervals of a given phase.

Four variable timers **102*a*, 102*b*, 102*c* and 102*d* are utilized for the four traffic intervals at a two-phase intersection, as here illustratively depicted. These four timers are identical, and so the detailed circuitry of only the first variable timer 102*a* is described. Each component within timer 102*a* bears a reference numeral ending in the letter suffix "a," and timers 102*b*, 102*c*, and 102*d*** include like components which are herein referred to by like reference numbers but having the letter suffix of the timer in which it is found.

Powerline 41 is connected to power input terminal of each interval timer such as power input terminal **104*a* of timer 102*a*. Power terminal 104*a* is tied to the collector of NPN-transistor 106*a*. The base and the collector of transistor 106*a* are coupled together by resistor 108*a*. The base of transistor 106*a* is tied to the collector of NPN-transistor 110*a* which has its emitter tied to ground. The base of transistor 110*a* is coupled through resistor 112*a* to the cathodes of diodes 114*a* and 116*a*. The anodes of diodes 114*a* and 116*a* are connected respectively to input terminals of 118*a* and 120*a*. The base of transistor 110*a* is also coupled to ground through resistor 122*a***.

The emitter of transistor **106*a* is tied to the anode of SCR 124*a* which has its gate tied to input terminal 126*a* and its cathode tied to input terminal 128*a*. The cathode of SCR 124*a* is also connected to one side of resistor 130*a* and to one side of resistor 132*a*. The second side of resistors 130*a* and 132*a* are coupled respectively to the anodes of diodes 134*a* and 136*a*, the cathodes of which are tied respectively to output terminals 138*a* and 140*a*. The cathode of SCR 124*a* is additionally coupled to ground through resistor 142*a* and is tied directly to output terminal 144*a*. The cathode of SCR 124*a* is further coupled through resistor 146*a* to line 148*a*. The first terminal of rheostat 150*a* is connected to line 148*a*, while the other terminal of that rheostat is coupled through resistor 152*a* to the first plate of capacitor 154*a*. The second plate of capacitor 154*a* is tied to the first side of primary 156*a* of transformer 158*a*. The second side of primary 156*a* is tied to ground. Line 148*a* is coupled by resistor 160*a* to base 2 of UJT 162*a*. Base 1 of UJT 162*a* is tied to ground, while the emitter of UJT 162*a* is tied to the junction of resistor 152*a* and capacitor 154*a*. Zener diode 164*a* has its cathode tied to line 148*a* and its anode tied to ground. Output terminal 166*a* is tied to the first side of secondary 167*a* of transformer 158*a*, while output terminal 168*a* is tied to the other side of secondary 167*a*. The side of secondary 167*a* tied to terminal 168*a* is of the same polarity as the side of primary 156*a* that is tied to capacitor 154*a***.

The operation of each of the variable timers **102*a*–102*d* is similar to that of power control circuit 30 and synchronization unit 48. If there is no input applied to either terminal 118*a* or 120*a* and if voltage is available to power terminal 104*a* from powerline 41, then transistor 110*a* is cut off and transistor 106*a* conducts. As a consequence, voltage is available to the anode of SCR 124*a*. When the gate input terminal 126*a* is at a higher potential than is the cathode input terminal 128*a*, SCR 124*a* is triggered to its conductive state, providing an indication to output terminals 138*a*, 140*a* and 144*a*. The output from terminal 144*a* is applied to input terminals 118*c* and 118*d* of timers 102*c* and 102*d*, respectively. As a result, transistors 110*c* and 110*d* turn on, and transistors 106*c* and 106*d* are cut off. Therefore, there is no current available to the anodes of SCR's 124*c* and 124*d***, and so even if a positive pulse appeared at the gate of one of those SCR's, it would not conduct. Consequently, output indications can not be generated by two timing units simultaneously.

A charging path for capacitor 154*a* is provided from SCR 124*a* through resistor 146*a*, rheostat 150*a*, resistor 152*a* and transformer primary 156*a*. Once the voltage on capacitor 154*a* reaches the triggering level of UJT 162*a*, the UJT fires, discharging capacitor 154*a*. As a consequence, the first side of primary 156*a* goes negative, and so secondary 167*a* causes an output on output terminals 166*a* and 168*a*, with terminal 166*a* being positive relative to terminal 168*a*. This output pulse is applied to input terminals 126*b* and 128*b* of variable timer 102*b*, causing SCR 124*b* therein to become conductive. As a result, a positive voltage appears at output terminals 138*b*, 140*b*, and 144*b*. The voltage on terminal 144*b* is applied to input terminal 120*a*, causing transistor 110*a* to turn on. Therefore, transistor 106*a* is cut off, and voltage is no longer available at the anode of SCR 124*a*. Thus, once variable timer 102*a* has timed its interval, timer 102*a* is reset by the commencement of operation of variable timer 102*b* which then times the next interval. The output from terminal 144*b* is also applied to input terminal 120*d*, retaining transistor 110*d* in its conductive state, and so transistor 106*d* remains cut off to insure current can not flow through SCR 124*d*. Since no voltage is applied to either input terminal 118*c* or input terminal 120*c*, transistor 110*c* cuts off, and transistor 106*c* turns on, thereby making current available to the anode of SCR 124*c*. Hence, timer 102*c* is enabled to start the timing of the next interval upon the application of an appropriate pulse to its input terminals 126*c* and 128*c*.

Once variable timer 102*b* has timed the second interval, UJT 162*b* fires, and an output pulse is generated at output terminals 166*b* and 168*b*. This pulse is applied to input terminals 126*c* and 128*c* of variable timer 102*c*, which has just been enabled. SCR 124*c* within timer 102*c* is triggered to its conductive state by this pulse, and output indications are provided on output terminals 138*c*, 140*c* and 144*c*. The voltage on output terminal 144*c* is applied to input terminal 120*b*, terminating the flow of current to the anode of the SCR 124*b* and ending the timing of the second interval. The output voltage on terminal 144*c* is also applied to input terminal 118*a* to insure that transistor 106*a* remains cut off. Therefore, there is no current available to the anode of SCR 124*a*, and so even if a positive voltage were to appear on the gate of that SCR, it would not conduct. Consequently, timer 102*a* can not provide erroneous outputs. Since neither input terminal 118*a* nor input terminal 120*d* has a voltage applied to it, transistor 110*d* cuts off, and transistor 106*d* turns on, making current available to the anode of SCR 124*d*. Thus, timer 102*d* is enabled, making it ready to time the next interval after timer 102*c* has completed operation.

Once the voltage on capacitor 154*c* within timer 102*c* has reached the triggering level of UJT 162*c*, that UJT fires, causing an output indication on terminals 166*c* and 168*c*. This indication is applied to input terminals 126*d* and 128*d*, initiating the timing interval of timer 102*d*. As a result a voltage is available at output terminals 138*d*, 140*d*, and 144*d*. The output from terminal 144*d* is applied to input terminals 120*c* and 118*b* to cut off SCR 124*c* within timer 102*c* and to insure that SCR 124*b* within timer 102*b* remains in its nonconductive state. Thus, the timing of the fourth interval is commenced. After the voltage on the capacitor 154*d* within variable timer 102*d* has reached the triggering level of UJT 162*d*, that UJT fires, terminating the fourth timing interval and causing an output indication on terminals 166*d* and 168*d*. This indication is applied to terminals 126*a* and 128*a* to turn on SCR 124*a* within timer 102*a*, thereby returning the timers to the first timing interval.

When the cyclic timer of the present invention is to be utilized within the traffic controller of this invention, switching unit 170 receives inputs from the timing units 102*a*–102*d*, and in response to these inputs switching unit 170 controls the excitation provided to the right-of-way indicators at the intersection. Within switching unit 170 a source of excitation such as 120 volts at 60 Hertz is applied, for example through a transformer 172, to the anodes of each of the SCR's 176, 178 and 180. The cathode of SCR 176 is connected to one side of relay coil 182. The cathode of SCR 178 is tied to one side of relay coil 184. The cathode of SCR 180 is tied to one side of relay coil 186. The second side of each of the relay coils 182, 184 and 186 is tied to ground. The pickup times of the relays 182, 184 and 186 is not critical; however, each relay 182, 184, and 186 has a time delay on dropout, preferably, in the order of 16.67 milliseconds. Preferably, each relay coil 182, 184 and 186 includes a diode across the coil, with the anode of the diode tied to ground, to protect the circuitry from voltage surges on dropout.

The gate of SCR 176 is tied to the cathode of diode 188, the anode of which is connected to output terminal 138*a* from timer 102*a* and to output terminal 140*c* from timer 102*c*. Similarly, the gate of SCR 178 is tied to the cathode of diode 190, the anode of which is connected to output terminal 138*b* from timer 102*b* and to output terminal 138*d* from timer 102*d*. Likewise, the gate of SCR 180 is tied to the cathode of diode 192 which has its anode connected to output terminal 138*c* of timer 102*c* and to output terminal 140*d* of timer 102*d*. Each of the SCR's 176, 178, and 180 has its gate coupled to its cathode by means of resistors 194, 196 and 198 respectively.

In the illustrative example depicted in FIG. 2, each of the relays 182, 184 and 186 is a triple-pole, double-throw relay. Each of the three moving contacts 182*a*, 182*d* and 182*g* of relay 182 is connected to a source of excitation such as 110 volts at 60 Hertz. Preferably, this excitation source is maintained in phase with the excitation applied through transformer 172 to SCR's 176, 178 and 180, for example by obtaining both excitation voltages from the same generating source.

Normally closed relay contact 182*b* is connected to normally open relay contact 184*c* of relay 184. Normally open contact 182*c* is connected to normally closed contact 184*b*. Normally closed contact 182*e* is connected to normally open contact 184*f*. Normally closed contact 182*h* is connected to normally closed contact 184*h*. There are no connections to contacts 182*f*, 182*i*, 184*e* and 184*i*.

Moving contacts 184*a*, 184*d*, and 184*g* of relay 184 are connected respectively to moving contacts 186*a*, 186*d* and 186*g* of relay 186. The normally closed and normally open contacts of relay 186 are connected to the right-of-way indicators at the traffic intersection. Thus, if the right-of-way indicator is a standard red-yellow-green signal lamp, normally closed contact 186*b* is connected to the phase A green and to the phase B red indicator lamps. Normally open contact 186*c* is connected to the phase A red and to the phase B green indicator lamps. Normally closed relay contact 186*e* is connected to the phase A yellow (amber) indicator lamp. Normally open contact 186*f* is connected to the phase B yellow (amber) indicator lamp. Normally closed relay contact 186*h* is available for connection to an emergency indicator such as an indicator providing a red signal to all traffic phases. Normally open contact 186*i* is available to provide excitation to an additional traffic phase such as a pedestrian right-of-way phase during which a walk indicator might be energized. Each of these connections from the relay contacts to the indicator lamps might, of course, be made through lamp relays which in turn provide the higher power excitation required by the indicator lamps.

In the absence of voltage on line 34 or in the presence of a signal on line 44, there is no voltage available on power line 41, and so none of the timing units 102*a*–102*d* is operating. Consequently, relays 182, 184 and 186 are all deenergized. In such a case, the 110 volt, 60 Hertz excitation passes through relay contacts 182*g*, 182*h*, 184*h*, 184*g*, 186*g* and 186*h* to the emergency indicator. Thus, in such an instance this emergency indicator is energized to provide a suitable indication at the traffic intersection.

When the situation causing this condition ends, so that there is voltage on line 34, and no signal on line 44, transistor 32 conducts, and so voltage is available on power line 41. However, since the SCR 124 in each timing unit 102*a*–102*d* is not conducting, the timing units do not become operative. Current through resistor 46, rheostat 52, resistor 54 and transformer primary 58 charges capacitor 56. When the triggering level of UJT 64 is reached, that UJT fires, and a pulse is generated on output lines 72 and 74, with line 74 being positive with respect to line 72. This output pulse is applied through terminals 126*d* and 128*d* of timing unit 102*d* to the gate-cathode circuit of SCR 124*d*, turning on that SCR.

An output indication in the form of a positive voltage is then available at terminals 138*d*, 140*d*, and 144*d*. The output at terminal 144*d* disables timers 102*b* and 102*c* by turning on transistors 110*b* and 110*c*. The output voltage at terminal 144*d* is also present at terminal 128*d*. This positive voltage is sent back by line 72 to sequencing unit 48 in which it passes through diode 80 and resistor 78 to the gate of SCR 76. Consequently, SCR 76 conducts, clamping line 50 so that capacitor 56 is unable to charge, and UJT 64 does not again fire. The output indications from terminals 138*d* and 140*d* are applied to the gates of SCR's 178 and 180, respectively, within switching unit 170. As a consequence, SCR's 178 and 180 are triggered to their conductive state. During each positive half cycle of the voltage output from transformer 172, current flows through relay coils 184 and 186. Since the relay coils have a delay on dropout, they remain continuously energized, and 110 volt, 60 Hertz excitation is applied through relay contacts 182*a*, 182*b*, 184*c*, 184*a*, 186*a* and 186*c*, and also through relay contacts 182*d*, 182*e*, 184*f*, 184*d*, 186*d*, and 186*f*. As a consequence, the signal indicator 14 indicates the phase B clearance interval in which the phase B green, phase B yellow, and phase A red indicators are energized.

When the voltage on capacitor 154*d* within timing unit 102*d* reaches the triggering level of UJT 162*d*, that UJT fires, and an output pulse is provided to terminals 166*d* and 168*d*. This pulse is applied through terminals 126*a* and 128*a* of timing unit 102*a* to trigger SCR 124*a*. An output is thus provided to terminal 144*a* which is applied to input terminal 118*d* of timing unit 102*d*, turning on transistor 110*d*. As a result, transistor 106*d* is cut off, terminating the current flow through SCR 124*d*. Thus, the output indications from timing units 102*d* end. The output from terminal 144*a* is also applied to input terminal 120*c* to insure that that timer can not be activated.

Since positive voltage is no longer available at output terminals 138*d* and 140*d*, during the next negative half cycle of voltage from transformer 172, SCR's 178 and 180 stop conducting, and so relay coils 184 and 186 are no longer energized. Because of the approximately 16.67 milliseconds delay on dropout of these relays, their moving contacts separate from their normally open contacts as the 110 volt, 60 Hertz excitation is passing through the zero level, and so substantially no arcing occurs. An output is applied from terminal 138*a* through diode 188 to the gate of SCR 176 within switching unit 170. That SCR then conducts during each positive half cycle of the voltage from source 172, and relay 182 is energized. 110 volt excitation then passes through relay contacts 182*a*, 182*c*, 184*b*, 184*a*, 186*a*, and 186*b* to cause the indicator 14 to indicate the phase A right-of-way interval in which the phase A green and the phase B red indicators are energized.

Once the voltage on capacitor 154*a* reaches the triggering level of UJT 162*a*, an output signal on terminals 166*a* and 168*a* is applied to input terminals 126*b* and 128*b*, turning on SCR 124*b*. The output from terminal 144*b* is applied to input terminal 120*a* to turn on transistor 110*a*, thereby cutting off transistor 106*a* and interrupting current flow to SCR 124*a*. Consequently, the output indications from timing unit 102*a* end. The output from terminal 144*b* is also applied to input terminal 120*d* to insure that timer 102*d* can not be activated. During the next negative half cycle from transformer 172, SCR 176 stops conducting, and relay 182 is deenergized. The output from terminal 138*b* passes through diode 190 to turn on SCR 178, thereby energizing relay coil 184. 110 volts, 60 Hertz excitation is then provided through relay contacts 182*a*, 182*b*, 184*c*, 184*a*, 186*a*, and 186*b* and through relay contacts 182*d*, 182*e*, 184*f*, 184*d*, 186*d*, and 186*e* to provide the phase A clearance interval indications in which the phase A green, phase A yellow and phase B red indicators are energized. When the voltage on capacitor 154*b* causes UJT 162*b* to fire, the resulting output indication on terminals 166*b* and 168*b* passes through input terminals 126*c* and 128*c* to turn on SCR 124*c*. The output from terminal 144*c* then is applied through input terminal 120*b* to turn on transistor 110*b*, thereby cutting off transistor 106*b* and terminating current flow through SCR 124*b*. Thus, all of the output indications from timing unit 102*b* are ended. During the next negative half cycle of current from transformer 172, SCR 178 stops conducting, and relay 184 is deenergized. The output from terminal 144*c* also insures that timer 102*a* is held in its inactive state.

The output from terminal 138*c* passes through diode 192 to trigger SCR 180, while the output from terminal 140*c* passes through diode 188 to trigger SCR 176. Consequently, relays 182 and 186 are energized. 110 volt, 60 Hertz excitation is applied through relay contacts 182*a*, 182*c*, 184*b*, 184*a*, 186*a*, and 186*c* to energize the indicators for the phase B right-of-way interval in which the phase A red and phase B green indicators are energized. When the voltage on capacitor 154*c* has reached the triggering level of UJT 162*c*, that UJT fires, and an output pulse is generated at terminals 166*c* and 168*c*. This pulse passes through terminals 126*d* and 128*d* to turn on SCR 124*d* within timing unit 102*d*. There is then an output on terminal 144*d* which is applied through input terminal 120*c* to terminate current flow through SCR 124*c*. Consequently, all of the output indications from timing unit 102*c* end, and relay 182 is deenergized. The output from terminal 140*d* passes through diode 192 to maintain SCR 180 in its conductive state, and so relay 186 remains energized. The output from terminal 138*d* passes through diode 190 to trigger SCR 178, energizing relay coil 184. Thus, the traffic controller is returned to the phase B clearance interval in which relays 184 and 186 are energized to provide phase A red, phase B green and phase B yellow indications.

If the controller is at an isolated intersection and is not connected to a centralized traffic controller, it continues to cycle in this manner indefinitely. Should power be lost from line 34, the emergency indications are again provided. If the controller is tied by line 44 to a control center, then the controller continues to cycle in this manner either until the supply voltage on line 34 is lost or until a remote override signal is applied on line 44. In either event, excitation on power line 41 is terminated, and the three relays 182, 184 and 186 are deenergized, returning the controller to its emergency condition in which for example, a continuous red might be provided for both traffic phases. Elimination of the condition which causes this emergency indication results in resumption of operation as previously described.

The length of time allocated to each traffic interval is determined within the timing unit 102 associated with that interval by the amount of time required for the voltage on capacitor 154 to reach the triggering voltage of the UJT 162. This time is determined by the adjustment of the rheostat 150 within that timer, as well as by the size of the capacitor 154 and resistor 152. Zener diode 164 insures constant voltage on line 148 so that the time required for the timer to operate is constant. If preferred, two zener diodes can be utilized in series in place of zener diode 164, with one of the zener diodes having a positive temperature coefficient and the other having a negative temperature coefficient, thus insuring temperature stability. The time of operation of the timer within synchronization unit 48 is controlled in the same manner. If desired, additional output terminals can be provided to enable the attachment of another capacitor in parallel with capacitor 154 within any of the timing units or with capacitor 56 in the synchronization unit so that a longer interval can be timed.

The above description has been with reference to a two-phase traffic controller. The controller can, of course, provide indications for additional traffic phases simply by adding the necessary relay contacts within switching unit 170 and by adding two timing units 102 for each additional traffic phase, one to time the right-of-way interval and one to time the clearance interval for that additional traffic phase. Additionally, while the above description has been with reference to a fully automatic traffic controller, the controller can be converted to semiautomatic operation in which a signal from a vehicle detector is required to bring right-of-way to a side street. This might be accomplished, for example, by removing the inputs from terminals **126*b* and 128*b* of the main street clearance interval timer 102*b* and instead connecting those input terminals to the side street vehicle detector, as illustrated in FIG. 1 by vehicle detectors 200 and 202 which are provided on the side roadway 13 at a more isolated intersection and which are connected to the controller 18 at that intersection by cable 204**. Such a connection might, of course, include a time delay to insure at least a minimum right-of-way interval on the main street. The connection could also include such features as vehicle gap timing on the main street to adjust the minimum right-of-way interval for that main street.

At an isolated intersection, a single signal controller in accordance with this invention can be utilized. At a series of consecutive signalized intersections such as depicted in FIG. 1, a separate controller can be utilized at each intersection. These controllers can then be synchronized, for example, from a central control center 22, by means of the two wires within each cable 20. One of these wires is connected to line 44 to provide a remote override command, while the second is connected to ground to insure a common reference point. The controllers can then be synchronized by sequentially removing the override signals at the time interval desired between initiation of right-of-way on the main street at the several consecutive intersections. By way of examples, central control center 22 might be a digital computer programmed to provide excitation on the desired remote input lines 44 at the desired intervals, or it might be a group of manually operated switches. While a common reference could be provided by interconnecting adjacent controllers with a ground line so that each cable 20 need include but a single conductor connected to line 44, greater reliability is obtained by including a separate ground line for each controller within the cable 20. The lines within cable 20 might be obtained by installing lines for that purpose, or they might be previously installed lines such as telephone lines.

To enable right-of-way to be controlled by central control center 22, remote input line 44 is energized to disable all the timing units **102*a*–102*d*, and commands are applied to SCR's 176, 178 and 180 directly from center 22. For this purpose, the anodes of diodes 188, 190 and 192 are connected, respectively, to the cathodes of diodes 206, 208 and 210, the anodes of which are tied by lines within cable 20 to outputs of central control center 22. Center 22 then applies enabling signals through these diodes to the gates of SCR's 176, 178 and 180 to energize the appropriate relays 182, 184 and 186 so that the desired right-of-way indications are generated. Should central control center 22 fail, removal of power from line 44 results in resumption of operation of timing modules 102*a*–102*d* so that controller 18** operates independently.

FIG. 3 depicts an alternative embodiment of a timing unit suitable for use in a cyclic timer and in a traffic controller in accordance with the present invention. Power terminal 104 is connected to a suitable source of voltage such as powerline 41 and is tied to the anode of SCR 124. Resistor 125 is coupled between the gate and the cathode of SCR 124. The gate of SCR 124 is also tied to input terminal 126, while the cathode of SCR 124 is tied to the anode of diode 127. The cathode of diode 127 is tied to input terminal 118 and is coupled by capacitor 143 to output terminal 144. The cathode of diode 127 is also coupled through resistor 130 to the anodes of diodes 134 and 136, the cathodes of which connect respectively to output terminals 138 and 140. In addition, the cathode of diode 127 is coupled to ground through resistor 142 and is coupled by resistor 146 to line 148. Serially connected rheostat 150 and resistor 152 couple line 148 to the first plate of capacitor 154, the second plate of which is grounded. UJT 162 has its emitter tied to the junction of resistor 152 and capacitor 154, its base 2 coupled to line 148 by resistor 160, and its base 1 coupled to ground by resistor 163. Base 1 of UJT 162 is tied to the anode of diode 165, the cathode of which is connected to output terminal 166. To ensure constant voltage on line 148 and thus constant triggering time for the circuit, zener diode 164 is tied between line 148 and ground.

When this timing circuit is to commence operation, for example, in the cyclic timer of FIG. 2, a positive pulse is applied to terminal 126, causing SCR 124 to conduct. Current is then available to output terminals 138 and 140 through SCR 124, diode 127, resistor 130 and diodes 134 and 136. The voltage at the junction of resistor 142 and capacitor 143 rises, and capacitor 143 passes a voltage pulse to output terminal 144 which is tied to input terminal 118 of the preceding timing unit. As a consequence, this high-voltage pulse is applied to the cathode of the diode 127 in that preceding timing unit, causing the SCR 124 in that unit to stop conducting, thereby terminating the operation of that timing unit. Current through resistor 146, rheostat 150 and resistor 152 charges capacitor 154. When the voltage on capacitor 154 reaches the triggering level of UJT 162, that UJT fires, applying a positive voltage pulse through diode 165 to output terminal 166 which is tied to input terminal 126 of the following timing unit. This pulse turns on the SCR 124 in that following timing unit, initiating its timing interval. The voltage pulse through the capacitor 143 of that following unit is applied to terminal 118 of this timing unit, stopping current flow through SCR 124 and returning this timing unit to its inactive state.

Figure 4:
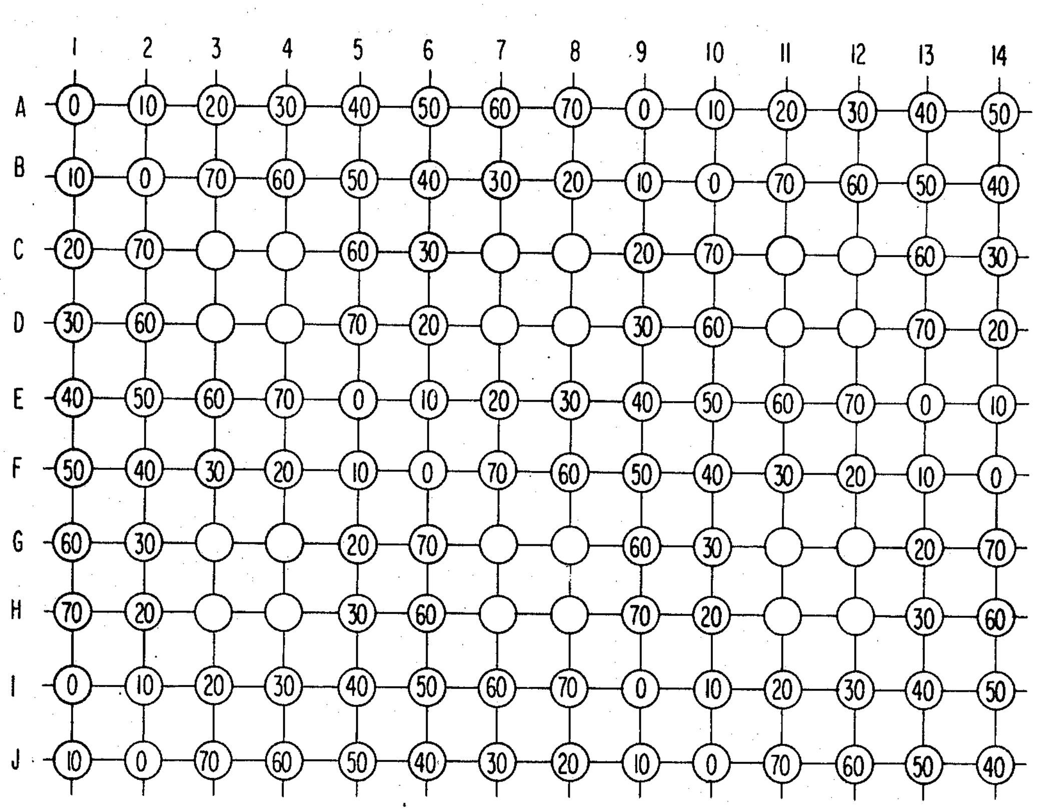
FIG. 4 is a diagrammatic representation of an intersection system controlled in accordance with the present invention.

FIG. 4 depicts a system of intersections which conveniently might be controlled in accordance with the present invention. In the illustrative system there depicted, there are a plurality of streets laid out in a north-south direction and numbered one through 14 and a plurality of streets laid out in an east-west direction and lettered A through J. However, any number of intersecting streets might be controlled in accordance with the present invention. The 14 streets laid out in a north-south direction and 10 streets laid out in an east-west direction result in 140 intersections. This intersection system is such that the same fixed time is required to travel from one intersection to the next in either direction on any street. If the distance between intersections varies, then the driving speed also varies so that the driving time between adjacent intersections remains constant. In the illustrative system of intersections of FIG. 4, 10 seconds are required to drive between any two adjacent intersections.

Figure 5:
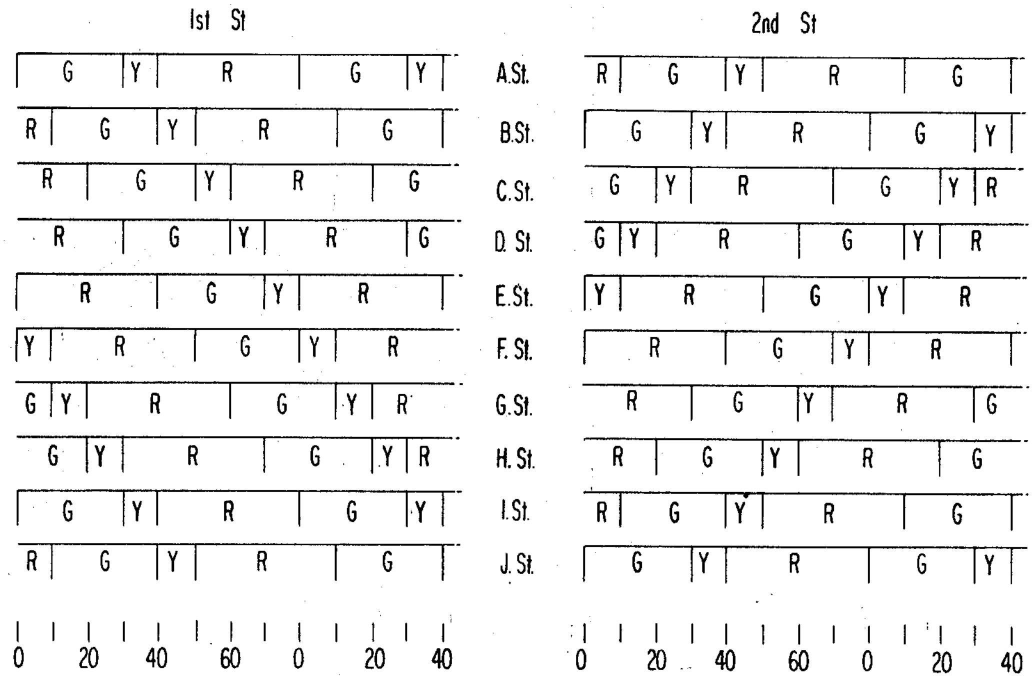
FIG. 5 contains timing diagrams explanatory of the intersection control system of FIG. 4.

At certain ones of the intersections of FIG. 4, right-of-way is controlled, for example by means of a controller in accordance with the present invention, in a manner which causes a driver traveling in a preferred direction to continuously receive right-of-way at each intersection he approaches. By way of illustration, FIG. 5 depicts time representations of the traffic indicator intervals which might be provided drivers traveling south on 1st Street and to drivers traveling north on 2nd St. Thus, a southbound driver on 1st St. approaching A St. receives the green right-of-way indication at time 0. This green signal lasts for 30 seconds and is followed by a 10 second yellow or clearance interval. There is then a 40 second red interval during which traffic on A. St. has its right-of-way and clearance intervals. The 1st St. traffic is then again given right-of-way 80 seconds after the initial right-of-way interval began, and this is designated in FIG. 5 as another time 0. This sequence of traffic indicator intervals at the intersection of 1st St. and A. St. repeats continuously.

The southbound traffic on 1st St. approaching B. St. is first given right-of-way at a time 10 seconds after right-of-way was initially given it at A. St. As seen in FIG. 5, the B. St. traffic indicator sequence is the same as that at A. Street but is delayed 10 seconds with respect thereto. In a similar manner, the southbound driver on 1st Street is given right-of-way at each succeeding intersection at intervals of 10 seconds. Thus, the southbound driver on 1st St. initially receives right-of-way at C. St. at time 20 seconds, at D. St. at time 30 seconds, at E. St. at time 40 seconds, at F. St. at time 50 seconds, at G. St. at time 60 seconds and at H. St. at time 70 seconds, all with respect to time 0. He initially receives right-of-way at I Street at time 80 seconds after he initially received right-of-way at A. St. however, by this time southbound traffic on 1st Street approaching A. St. is again being given right-of-way, and thus this is another time 0. At J. St. right-of-way is commenced at time 10 seconds after time 0. Thus, so long as the intersection separation distances and the driving speed are such that 10 seconds are required for a driver to travel southbound on 1st St. from one intersection to the next, he continuously receives right-of-way as he approaches each intersection. In a similar manner, as seen from FIG. 5, a northbound driver on 2nd St. continuously receives right-of-way so long as he takes 10 seconds to drive from intersection to the next, and, with respect to time 0, right-of-way is given northbound drivers on 2nd St. at the following times: J. St.—time 0; I. St.—10 seconds; H. St.—20 seconds; G. St.—30 seconds; F. St.—40 seconds; E. St.—50 seconds; D. St.—60 seconds; C. St.—70 seconds; B. St.—time 0 (80 seconds); A. St.—10 seconds.

An eastbound driver on A. St. likewise is continuously given right-of-way as he approaches each intersecting street. As seen from FIG. 5, southbound traffic on 1st St. receives a red indication at a time 40 seconds after time 0. This is the time when eastbound traffic on A. St. initially receives right-of-way. An eastbound driver on A. St. thus initially receives right-of-way at the intersections in accordance with the following sequence: 1st St.—40 seconds; 2nd St.—50 seconds; 3rd St.—60 seconds; 4th St.—70 seconds, 5th St.—time 0 (80 seconds); 6th St.—10 seconds; 7th St.—20 seconds; 8th St.—30 seconds; 9th St.—40 seconds; 10th St.—50 seconds; 11th St.—60 seconds; 12th St.—70 seconds; 13th St.—time 0 (80 seconds); and 14th St.—10 seconds. FIG. 4 depicts illustratively 14 north-south streets and 10 east-west streets, and at each intersection of interest is indicated the time at which right-of-way is initially given north-south traffic with respect to time 0. Form FIG. 4 it can be seen that southbound traffic can travel on 1st, 5th, 9th or 13th Streets and continuously receive right-of-way, while northbound traffic can travel on 2nd, 6th, 10th or 14th Streets and continuously receive right-of-way. In a similar manner, eastbound traffic can travel on A. St., E. St., or I. St. and continuously receive right-of-way; while westbound traffic can travel on B. St., F. St., or J. St. and continuously receive right-of-way. This 10 by 14 intersection pattern can, of course, be repeated to cover as large an area as desired.

Traffic on 3rd St., 4th St., 7th St., 8th St., 11th St., 12th St., C. St., D. St., G. St. and H. St. does not get a continuous right-of-way as it travels. These streets are thus available for local traffic which is not so concerned with receiving uninterrupted right-of-way. Intersections such as C. St. and 3rd Street and such as D. St. and 4th St. thus may not require right-of-way control. There cannot be control in any manner which will provide uninterrupted right-of-way to all of the traffic, and thus if right-of-way control is provided, it can be set in any manner desired.

Each of the controlled intersections in the system depicted in FIG. 4 might be provided with its own controller for operating the right-of-way indicators. Alternatively, nearby intersections which operate on the same traffic indicator sequence might utilize a common controller. Thus, for example one controller might be utilized for the indicators at 1st St. and A. St. and the indicators at 2nd St. and B. St., since each of these two intersections commences its right-of-way interval at the same time. Likewise, one controller can be utilized to control the indicators at 2nd St. and A. St. and the indicators at 1st St. and B. St. If desired, a single controller could control the indicators at every intersection having the same traffic interval sequence. Thus, one controller controls indicators at every intersection at which right-of-way is initially provided at time 0, a second controller controls the indicators at each intersection at which right-of-way is initially provided 10 seconds after time 0, a third controller controls the indicators at each intersection at which right-of-way is initially provided 20 seconds after time 0, etc. Because of the large number of right-of-way indicators which would require energization, lamp relays might be utilized.

Should it be desired to make each right-of-way interval longer than the 30 seconds depicted in FIG. 5, a corresponding change would be necessitated in the pattern of the street system. Thus, for example, if each traffic interval sequence were to include 40 seconds of right-of-way, 10 seconds of clearance and 50 seconds of red, then the street pattern would repeat every 10 streets rather than every eight streets as depicted in FIG. 4. Thus, 1st St. and 11th Street would have the same traffic interval sequence and likewise A. St. and K. St. would have the same traffic interval sequence. Similarly, if the driving time between adjacent intersections is other than 10 seconds, a timing adjustment would be required. Thus, for example, if 12 seconds were required to travel from one intersection to the next, a southbound driver on 1st St. would initially be given right-of-way at the consecutive streets at time 0, at 12 seconds, at 24 seconds, at 36 seconds, etc. Preferably, the quotient of the total traffic interval sequence time (i.e., right-of-way interval time plus clearance interval time plus stop interval time) divided by the driving time between adjacent intersections is an integer so that the pattern is repetitive, thereby increasing the number of streets on which drivers continuously receive right-of-way. Thus, this intersection control system is adaptable to any distance between intersections.

What is claimed is:

1. A cyclic timer comprising:

a. a plurality of timing modules, each timing module including:

1. first switching means having a first input, a second input, a power input, and an output, and capable in response to a signal on its first input of assuming an activated state in which current is permitted to pass from said power input through said first switching means to provide an output signal at said first switching means output and is response to a signal on its second input of assuming a deactivated state in which current is prevented from passing from said power input through said first switching means;
2. voltage storage means coupled to said first switching means output and adapted to be charged therefrom;
3. voltage-responsive switching means coupled to said voltage storage means for discharging said voltage storage means in response to a predetermined voltage level on said voltage storage means;
4. a transformer coupled to said voltage storage means for generating a termination signal in response to discharge of said voltage storage means;
5. means for connecting said transformer to the first switching means first input of an adjacent timing module, whereby each timing module of said plurality of timing modules has its transformer connected to an unique one of said timing modules to activate the first switching means of said adjacent timing module upon generation of the termination signal; and
6. means for connecting said first switching means second input to the first switching means output of said adjacent timing module to deactivate said first switching means upon activation of the first switching means of said adjacent timing module; and b. signaling means for applying a starting signal to the first switching means first input of one of said timing modules to initiate operation of said cyclic timer.

2. A timer as claimed in claim 1 further comprising power control means connected to the power input of the first switching means of each timing module and adapted for connection to a source of voltage, said power control means including a control input and when connected to a source of voltage adapted to assume in the absence of a signal at its control input a first state in which power is provided to the first switching means of each timing module and to assume in the presence of a signal at its control input a second state in which power is blocked from the first switching means of each timing module.

3. A timer as claimed in claim 1 in which the first switching means of each timing module includes:

a. controlled rectifier means having an input terminal connected to said first switching means power input, an output terminal connected to said first switching means output, and a control terminal connected to said first switching means first input, said controlled rectifier means normally assuming a first state in which current flow from its input terminal to its output terminal is prevented, said controlled rectifier means in response to a signal applied to its control terminal assuming a second state in which current flow is permitted from its input terminal to its output terminal, said controlled rectifier means upon assumption of the second state remaining in the second state so long as current is available to its input terminal; and b. solid-state control means having a first terminal adapted for connection to an electric power source, a second terminal connected to said controlled rectifier means input terminal, and a third terminal connected to said first switching means second input, said solid-state control means in the absence of a signal on its third terminal permitting current flow from its first terminal to its second terminal and in the presence of a signal on its third terminal preventing current flow from its first terminal to its second terminal.

4. A timer as claimed in claim 1 in which said voltage responsive switching means comprises a unijunction transistor.

5. A controller for assigning traffic intervals to the conflicting traffic movements at an intersection having N conflicting traffic movements each of which is to be assigned in turn traffic intervals including a right-of-way interval followed by a clearance interval, said controller comprising:

I. a cyclic timer including:

a. 2N timing modules, each timing module including:

1. first switching means having a first input, a second input, a power input, and an output, and capable in response to a signal on its first input of assuming an activated state in which current is permitted to pass from said power input through said first switching means to provide an output signal at said first switching means output and in response to a signal on its second input of assuming a deactivated state in which current is prevented from passing from said power input through said first switching means;
2. voltage storage means coupled to said first switching means output and adapted to be charged therefrom;
3. voltage responsive switching means coupled to said voltage storage means for discharging said voltage storage means in response to a predetermined voltage level on said voltage storage means;
4. a transformer coupled to said voltage storage means for generating a termination signal in response to discharge of said voltage storage means;
5. means for connecting said transformer to the first switching means first input of an adjacent timing module, whereby each timing module of said plurality of timing modules has its transformer connected to an unique one of said timing modules to activate the first switching means of said adjacent timing module upon generation of the termination signal; and
6. means for connecting said first switching means second input to the first switching means output of said adjacent timing module to deactivate said first switching means upon activation of the first switching means of said adjacent timing module; and b. signaling means for applying a starting signal to the first switching means first input of one of said timing modules to initiate operation of said cyclic timer; and II. further switching means coupled to said cyclic timer and adapted for connection to an intersection right-of-way indicator for receiving output signals from said cyclic timer and in response thereto providing excitation for said right-of-way indicator to cause said indicator to indicate traffic intervals.

6. A controller as claimed in claim 5 in which the first switching means of each timing module includes:

a. controlled rectifier means having an input terminal connected to said first switching means power input, an output terminal connected to said first switching means output, and a control terminal connected to said first switching means first input, said controlled rectifier means normally assuming a first state in which current flow from its input terminal to its output terminal is prevented, said controlled rectifier means in response to a signal applied to its control terminal assuming a second state in which current flow is permitted from its input terminal to its output terminal, said controlled rectifier means upon assumption of the second state remaining in the second state so long as current is available to its input terminal; and b. solid-state control means having a first terminal adapted for connection to an electric power source, a second terminal connected to said controlled rectifier means input terminal, and a third terminal connected to said first switching means second input, said solid-state control means in the absence of a signal on its third terminal permitting current flow from its first terminal through its second terminal and in the presence of a signal on its third terminal preventing current flow from its first terminal to its second terminal.

7. A controller as claimed in claim 5 in which said voltage responsive switching means comprises a unijunction transistor.

8. A controller as claimed in claim 5 further comprising power control means connected to the power input of the first switching means of each timing module and adapted for connection to a source of voltage, said power control means including a control input and when connected to a source of voltage adapted to assume in the absence of a signal at its control input a first state in which power is provided to each of said first switching means and to assume in the presence of a signal at its control input a second state in which power is blocked from each of said first switching means.

9. A controller as claimed in claim 8 in which said signaling means comprises additional voltage storage means coupled to said power control means to be charged therefrom, additional voltage responsive switching means coupled to said additional voltage storage means for discharging said additional voltage storage means in response to a predetermined voltage level on said additional voltage storage means, and additional signaling means coupled to said additional voltage storage means and to the first switching means first input of one of said timing modules to apply an initiating signal thereto in response to discharge of said additional voltage storage means.

10. A controller as claimed in claim 8 in which said signaling means comprises a vehicle detector coupled to the first switching means first input of one of said timing modules to apply an initiating signal thereto in response to the detection of a vehicle on a traffic phase not having right-of-way.

11. A traffic control system for controlling right-of-way on a main roadway at a plurality of intersections comprising a like plurality of controllers, each of said controllers capable of assigning traffic intervals to the conflicting traffic movements at an associated intersection having N conflicting traffic movements each of which is to be assigned in turn traffic intervals including a right-of-way interval followed by a clearance interval, each of said controllers comprising:

I. a cyclic timer including:

a. 2N timing modules, each timing module including:

1. first switching means having a first input, a second input, a power input, and an output, and capable in response to a signal on its first input of assuming an activated state in which current is permitted to pass from said power input through said first switching means to provide an output signal at said first switching means output and in response to a signal on its second input of assuming a deactivated state in which current is prevented from passing from said power input through said first switching means;
2. voltage storage means coupled to said first switching means output and adapted to be charged therefrom;
3. voltage responsive switching means coupled to said voltage storage means for discharging said voltage storage means in response to a predetermined voltage level on said voltage storage means;
4. a transformer coupled to said voltage storage means for generating a termination signal in response to discharge of said voltage storage means;
5. means for connecting said transformer to the first switching means first input of an adjacent timing module, whereby each timing module of said plurality of timing modules has its transformer connected to an unique one of said timing modules to activate the first switching means of said adjacent timing module upon generation of the termination signal; and
6. means for connecting said first switching means second input to the first switching means output of said adjacent timing module to deactivate said first switching means upon activation of the first switching means of said adjacent timing module; and b. signaling means for applying a starting signal to the first switching means first input of one of said timing modules to initiate operation of said cyclic timer; and II. further switching means coupled to said cyclic timer and adapted for connection to an intersection right-of-way indicator for receiving output signals from said cyclic timer and in response 12. A traffic control system as claimed in claim 11 in which said master control means is connected to the additional switching means of each of said controllers for controlling provision of excitation to said right-of-way indicators.

13. A cyclic timer comprising:

a. a plurality of timing modules, each timing module including:
1. first switching means having a first input, a second input, a power input, and an output, said first switching means including:
i. controlled rectifier means having an input terminal connected to said power input, an output terminal connected to said first switching means output, and a control terminal connected to said first switching means first input, said controlled rectifier means normally assuming a first state in which current flow from its input terminal to its output terminal is prevented, said controlled rectifier means in response to a signal applied to its control terminal assuming a second state in which current flow is permitted from its input terminal to its output terminal, said controlled rectifier means upon assumption of the second state remaining in the second state so long as current is available to its input terminal;
ii. solid-state control means having a first terminal adapted for connection to an electric power source, a second terminal connected to said controlled rectifier means input terminal, and a third terminal connected to said first switching means second input, said solid-state control means in the absence of a signal on its third terminal assuming a first state in which current flow is permitted from its first terminal to its second terminal and in the presence of a signal on its third terminal assuming a second state in which current flow from its first terminal to its second terminal is prevented;
2. voltage storage means coupled to said first switching means output and adapted to be charged therefrom when said controlled rectifier means is in its second state and said solid-state control means is in its first state;
3. voltage responsive switching means coupled to said voltage storage means for discharging said voltage storage means in response to a predetermined voltage level on said voltage storage means;
4. first signaling means coupled to said voltage storage means for generating a termination signal in response to discharge of said voltage storage means;
5. means for connecting said first signaling means to the first switching means first input of an adjacent timing module, whereby each timing module of said plurality of timing modules has its first signaling means connected to an unique one of said timing modules to activate the first switching means of said adjacent timing module upon generation of the termination signal; and
6. means for connecting said first switching means second input to the first switching means output of said adjacent timing module to deactivate said first switching means upon activation of the first switching means of said adjacent timing module; and b. second signaling means for applying a starting signal to the first switching means first input of one of said timing modules to initiate operation of said cyclic timer.

14. A controller for assigning traffic intervals to the conflicting traffic movements at an intersection having N conflicting traffic movements each of which is to be assigned in turn traffic intervals including a right-of-way interval followed by a clearance interval, said controller comprising:

I. a cyclic timer including:

a. 2N timing modules, each timing module including:
1. first switching means having a first input, a second input, a power input, and an output, said first switching means including:
i. controlled rectifier means having an input terminal connected to said power input, an output terminal connected to said first switching means output, and a control terminal connected to said first switching means first input, said controlled rectifier means normally assuming a first state in which current flow from its input terminal to its output terminal is prevented, said controlled rectifier means in response to a signal applied to its control terminal assuming a second state in which current flow is permitted from its input terminal to its output terminal, said controlled rectifier means upon assumption of the second state remaining in the second state so long as current is available to its input terminal;
ii. solid-state control means having a first terminal adapted for connection to an electric power source, a second terminal connected to said controlled rectifier means input terminal, and a third terminal connected to said first switching means second input, said solid-state control means in the absence of a signal on its third terminal assuming a first state in which current flow is permitted from its first terminal to its second terminal and in the presence of a signal on its third terminal assuming a second state in which current flow from its first terminal to its second terminal is prevented;
2. voltage storage means coupled to said first switching means output and adapted to be charged therefrom when said controlled rectifier means is in its second state and said solid-state control means is in its first state;
3. voltage responsive switching means coupled to said voltage storage means for discharging said voltage storage means in response to a predetermined voltage level on said voltage storage means;

4. first signaling means coupled to said voltage storage means for generating a termination signal in response to discharge of said voltage storage means;
5. means for connecting said first signaling means to the first switching means first input of an adjacent timing module, whereby each timing module of said plurality of timing modules has its first signaling means connected to an unique one of said timing modules to activate the first switching means of said adjacent timing module upon generation of the termination signal; and
6. means for connecting said first switching means second input to the first switching means output of said adjacent timing module to deactivate said first switching means upon activation of the first switching means of said adjacent timing module; and b. second signaling means for applying a starting signal to the first switching means first input of one of said timing modules to initiate operation of said cyclic timer; and II. further switching means coupled to said cyclic timer and adapted for connection to an intersection right-of-way indicator for receiving output signals from said cyclic timer and in response thereto providing excitation for said right-of-way indicator to cause said indicator to indicate traffic intervals.

15. A traffic control system for controlling right-of-way on a main roadway at a plurality of intersections comprising a like plurality of controllers, each of said controllers capable of assigning traffic intervals to the conflicting traffic movements at an associated intersection having N conflicting traffic movements each of which is to be assigned in turn traffic intervals including a right-of-way interval followed by a clearance interval, each of said controllers comprising:

I. a cyclic timer including:

a. 2N timing modules, each timing module including:

1. first switching means having a first input, a second input, a power input, and an output, said first switching means including:

i. controlled rectifier means having an input terminal connected to said power input, an output terminal connected to said first switching means output and a control terminal connected to said first switching means first input, said controlled rectifier means normally assuming a first state in which current flow from its input terminal to its output terminal is prevented, said controlled rectifier means in response to a signal applied to its control terminal assuming a second state in which current flow is permitted from its input terminal to its output terminal, said controlled rectifier means upon assumption of the second state remaining in the second state so long as current is available to its input terminal;

ii. solid-state control means having a first terminal adapted for connection to an electric power source, a second terminal connected to said controlled rectifier means input terminal, and a third terminal connected to said first switching means second input, said solid-state control means in the absence of a signal on its third terminal assuming a first state in which current flow is permitted from its first terminal to its second terminal and in the presence of a signal on its third terminal assuming a second state in which current flow from its first terminal to its second terminal is prevented;

2. voltage storage means coupled to said first switching means output and adapted to be charged therefrom;
3. voltage-responsive switching means coupled to said voltage storage means for discharging said voltage storage means in response to a predetermined voltage level on said voltage storage means;
4. first signaling means coupled to said voltage storage means for generating a termination signal in response to discharge of said voltage storage means;
5. means for connecting said first signaling means to the first switching means first input of an adjacent timing module, whereby each timing module of said plurality of timing modules has its first signaling means connected to an unique one of said timing modules to activate the first switching means of said adjacent timing module upon generation of the termination signal; and
6. means for connecting said first switching means second input to the first switching means output of said adjacent timing module to deactivate said first switching means upon activation of the first switching means of said adjacent timing module; and b. second signaling means for applying a starting signal to the first switching means first input of one of said timing modules to initiate operation of said cyclic timer; and II. further switching means coupled to said cyclic timer and adapted for connection to an intersection right-of-way indicator for receiving output signals from said cyclic timer and in response thereto providing excitation for said right-of-way indicator to cause said indicator to indicate traffic intervals;

said traffic control system further comprising master control means connected to the power control means control input of each of said controllers for controlling the power applied to each of said first switching means.

* * * * *

UNITED STATES PATENT OFFICE
CERTIFICATE OF CORRECTION

Patent No. 3,644,884 Dated February 22, 1972

Inventor(s) John J. Matysek

It is certified that error appears in the above-identified patent and that said Letters Patent are hereby corrected as shown below:

Column 5, Line 46, "118a" should read --118d--.

Column 12, Line 41, "is" should read --in--.

Column 15, Line 38, after "response" there should read --thereto providing excitation for said right-of-way indicator to cause said indicator to indicate traffic intervals; said traffic control system further comprising master control means connected to the power control means control input of each of said controls for controlling the power applied to each of said first switching means.--.

Signed and sealed this 4th day of July 1972.

(SEAL)
Attest:

EDWARD M.FLETCHER,JR.
Attesting Officer

ROBERT GOTTSCHALK
Commissioner of Patents